United States Patent
Davidson et al.

(10) Patent No.: US 12,326,877 B2
(45) Date of Patent: *Jun. 10, 2025

(54) METHODS AND SYSTEMS FOR MULTI-DIMENSIONAL AGGREGATION USING COMPOSITION

(71) Applicant: Open Text Corporation, Waterloo (CA)

(72) Inventors: Nathaniel Davidson, Raanana (IL); Igor Makhlin, Haifa (IL); Alex Vladimir Popovich, Netanya (IL); Raman Walia, Bangalore (IN); Boris Grinblat, Tel Aviv (IL); Uri Kochavi, Tel Aviv (IL)

(73) Assignee: Open Text Corporation, Menlo Park, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/378,896

(22) Filed: Jul. 19, 2021

(65) Prior Publication Data

US 2021/0342367 A1    Nov. 4, 2021

Related U.S. Application Data

(63) Continuation of application No. 16/222,991, filed on Dec. 17, 2018, now Pat. No. 11,068,507, and a
(Continued)

(51) Int. Cl.
*G06F 16/28* (2019.01)
*G06F 9/38* (2018.01)
(Continued)

(52) U.S. Cl.
CPC .......... *G06F 16/283* (2019.01); *G06F 9/3895* (2013.01); *G06F 16/244* (2019.01);
(Continued)

(58) Field of Classification Search
None
See application file for complete search history.

(56) References Cited

U.S. PATENT DOCUMENTS

| | | |
|---|---|---|
| 5,191,525 A | 3/1993 | LeBrun et al. |
| 5,713,020 A | 1/1998 | Reiter |

(Continued)

FOREIGN PATENT DOCUMENTS

WO    WO-2012095839 A2 *    7/2012    .......... G06F 11/3419

OTHER PUBLICATIONS

Office Action for U.S. Appl. No. 13/538,928, mailed Jan. 2, 2014, 20 pgs.

(Continued)

*Primary Examiner* — Augustine K. Obisesan
(74) *Attorney, Agent, or Firm* — Sprinkle IP Law Group

(57) ABSTRACT

Multi-dimensional aggregation using user interface workflow composition is described. Data for a computer implemented process is in a set of related data objects in a data store with each object in the set of related data objects representing an entity modelled in the process. A number of levels for a multi-dimensional aggregation associated with a request is determined where each level of the multi-dimensional aggregation represents a different dimension of data values to be aggregated. Data is aggregated at the levels of aggregation based on the relationships between parent objects and children objects. The data for a final level of aggregation is output to a user interface. The final result includes multiple dimensions of data.

27 Claims, 4 Drawing Sheets

Related U.S. Application Data continuation of application No. 16/272,296, filed on Feb. 11, 2019, now Pat. No. 11,068,508, said application No. 16/222,991 is a continuation of application No. 13/538,928, filed on Jun. 29, 2012, now Pat. No. 10,169,442, and a continuation of application No. 13/538,889, filed on Jun. 29, 2012, now Pat. No. 10,235,441, said application No. 16/272,296 is a continuation of application No. 13/538,889, filed on Jun. 29, 2012, now Pat. No. 10,235,441, and a continuation of application No. 16/222,991, filed on Dec. 17, 2018, now Pat. No. 11,068,507, which is a continuation of application No. 13/538,928, filed on Jun. 29, 2012, now Pat. No. 10,169,442, and a continuation of application No. 13/538,889, filed on Jun. 29, 2012, now Pat. No. 10,235,441.

(51) Int. Cl.
    *G06F 16/242*  (2019.01)
    *G06F 16/2455* (2019.01)
    *G06F 17/17*   (2006.01)
    *G06Q 10/06*   (2023.01)

(52) U.S. Cl.
    CPC ...... *G06F 16/24556* (2019.01); *G06F 17/175* (2013.01); *G06Q 10/06* (2013.01)

(56) References Cited

U.S. PATENT DOCUMENTS

| | | |
|---|---|---|
| 6,163,774 A | 12/2000 | Lore |
| 6,405,207 B1 | 6/2002 | Petculescu |
| 6,775,682 B1 | 8/2004 | Ballamkonda |
| 7,165,065 B1 | 1/2007 | Welton et al. |
| 7,324,983 B1 | 1/2008 | Morris |
| 7,756,739 B2 | 7/2010 | D'hers et al. |
| 9,471,800 B2 | 10/2016 | Ho et al. |
| 10,169,442 B1 | 1/2019 | Davidson et al. |
| 10,235,441 B1 | 3/2019 | Makhlin |
| 11,068,507 B2 | 7/2021 | Davidson et al. |
| 11,068,508 B2 | 7/2021 | Davidson et al. |
| 11,868,717 B2 | 1/2024 | Ho |
| 2002/0038229 A1 | 3/2002 | Shah |
| 2004/0083222 A1 | 4/2004 | Pecherer |
| 2004/0128289 A1 | 7/2004 | Cochrane et al. |
| 2004/0139061 A1 | 7/2004 | Colossi |
| 2004/0243593 A1 | 12/2004 | Stolte |
| 2005/0060325 A1* | 3/2005 | Bakalash ............... G06F 16/30 |
| 2005/0138001 A1 | 6/2005 | Mittal et al. |
| 2005/0177814 A1* | 8/2005 | Martlage ............... G06F 8/38 717/102 |
| 2005/0182703 A1 | 8/2005 | D'hers |
| 2006/0161525 A1 | 7/2006 | Bordawakar et al. |
| 2006/0242180 A1 | 10/2006 | Graf et al. |
| 2006/0294129 A1 | 12/2006 | Stanfill |
| 2007/0233644 A1 | 10/2007 | Bakalash et al. |
| 2008/0027957 A1 | 1/2008 | Bruckner |
| 2008/0243660 A1* | 10/2008 | Amemiya ............... G06Q 40/00 705/35 |
| 2008/0294596 A1 | 11/2008 | Xiong |
| 2009/0006997 A1* | 1/2009 | Jiang ............... G06Q 10/00 715/771 |
| 2009/0013281 A1 | 1/2009 | Helfman |
| 2009/0018996 A1* | 1/2009 | Hunt ............... G06Q 30/02 |
| 2009/0049372 A1 | 2/2009 | Goldberg |
| 2009/0119309 A1 | 5/2009 | Gibson |
| 2009/0144307 A1* | 6/2009 | Bestgen ............ G06F 16/24556 707/999.102 |
| 2010/0017395 A1 | 1/2010 | Wayn |
| 2010/0057700 A1 | 3/2010 | Williamson |
| 2010/0058248 A1* | 3/2010 | Park ............... G06F 3/0481 715/851 |
| 2010/0246999 A1 | 9/2010 | Tillberg et al. |
| 2010/0313127 A1* | 12/2010 | Gosper ............... G06F 40/18 715/708 |
| 2011/0054860 A1 | 3/2011 | Guild |
| 2011/0295836 A1 | 12/2011 | Bolsius |
| 2012/0143870 A1 | 6/2012 | Ballard |
| 2012/0158165 A1* | 6/2012 | Bohm ............... G05B 19/4188 700/97 |
| 2012/0166616 A1 | 6/2012 | Meehan et al. |
| 2012/0173519 A1 | 7/2012 | Buessow |
| 2012/0216290 A1 | 8/2012 | Roy et al. |
| 2012/0330996 A1 | 12/2012 | Chang et al. |
| 2015/0213283 A1 | 7/2015 | Ho et al. |
| 2016/0179313 A1 | 6/2016 | Ho |
| 2019/0121817 A1 | 4/2019 | Davidson et al. |
| 2019/0171652 A1 | 6/2019 | Makhlin |
| 2021/0073531 A1 | 3/2021 | Ho |
| 2023/0005285 A1 | 1/2023 | Ho |

OTHER PUBLICATIONS

Office Action for U.S. Appl. No. 13/538,889, mailed Mar. 12, 2014, 31 pgs.
Office Action for U.S. Appl. No. 13/538,928, mailed Jun. 3, 2014, 24 pgs.
Office Action for U.S. Appl. No. 13/538,889, mailed Jul. 28, 2014, 36 pgs.
Office Action for U.S. Appl. No. 13/538,928, mailed Apr. 8, 2015, 29 pgs.
Office Action for U.S. Appl. No. 13/538,889, mailed May 6, 2015, 40 pgs.
Office Action for U.S. Appl. No. 13/538,928, mailed Sep. 4, 2015, 34 pgs.
Office Action for U.S. Appl. No. 13/538,889, mailed Oct. 2, 2015, 36 pgs.
Office Action for U.S. Appl. No. 13/538,928, mailed Jun. 28, 2016, 36 pgs.
Office Action for U.S. Appl. No. 13/538,889, mailed Jul. 20, 2016, 33 pgs.
Office Action for U.S. Appl. No. 13/538,928, mailed Jan. 4, 2017, 35 pgs.
Office Action for U.S. Appl. No. 13/538,889, mailed Jan. 19, 2017, 49 pgs.
Office Action for U.S. Appl. No. 13/538,889, mailed Oct. 2, 2017, 61 pgs.
Office Action for U.S. Appl. No. 13/538,928, mailed Oct. 2, 2017, 72 pgs.
Office Action for U.S. Appl. No. 13/538,928, mailed Apr. 17, 18, 83 pgs.
Office Action for U.S. Appl. No. 13/538,889, mailed May 9, 2018, 85 pgs.
Office Action for U.S. Appl. No. 16/222,991, mailed Aug. 31, 2020, 37 pgs.
Office Action for U.S. Appl. No. 16/272,296, mailed Sep. 10, 2020, 36 pgs.
Office Action issued for U.S. Appl. No. 16/953,561, mailed Mar. 29, 2022, 24 pages.
Office Action issued for U.S. Appl. No. 14/685,280, mailed Mar. 2, 2016, 6 pages.
Office Action issued for U.S. Appl. No. 17/940,777, mailed Mar. 27, 2023, 27 pages.
Notice of Allowance issued for U.S. Appl. No. 17/940,777, mailed Sep. 15, 2023, 12 pages.
Soderland, "Learning Information Extraction Rules for Semi-Structured and Free Text," Machine Learning 34, © 1999, pp. 233-272.

* cited by examiner

| Loan ID | Loan Amount | Collateral Amount |
|---|---|---|
| Loan 1 | 460,000 | 200,000 |
| Loan 1 | 460,000 | 170,000 |
| Loan 1 | 460,000 | 100,000 |
| Loan 2 | 375,000 | 300,000 |
| Loan 2 | 375,000 | 100,000 |

FIG. 3A

| Average Loan Amount | Average Collateral Amount |
|---|---|
| 426,000 | 174,000 |

FIG. 3B

| Loan ID | Loan Amount | Sum of Collateral Amount |
|---|---|---|
| Loan 1 | 460,000 | 470,000 |
| Loan 2 | 375,000 | 400,000 |

FIG. 3C

| Average Loan Amount | Average of Sum of Collateral Amount |
|---|---|
| 417,500 | 435,000 |

FIG. 3D

METHODS AND SYSTEMS FOR MULTI-DIMENSIONAL AGGREGATION USING COMPOSITION

CROSS-REFERENCE TO RELATED APPLICATIONS

This application is a continuation of, and claims a benefit of priority under 35 U.S.C. 120 from U.S. patent application Ser. No. 16/272,296, filed Feb. 11, 2019, entitled "METHODS AND SYSTEMS FOR MULTI-DIMENSIONAL AGGREGATION USING COMPOSITION," issued as U.S. Pat. No. 11,068,508, which is a continuation of i) U.S. patent application Ser. No. 13/538,889, filed Jun. 29, 2012, entitled "METHODS AND SYSTEMS FOR MULTI-DIMENSIONAL AGGREGATION USING COMPOSITION," issued as U.S. Pat. No. 10,235,441, and ii) U.S. patent application Ser. No. 16/222,991, filed Dec. 17, 2018, entitled "METHODS AND SYSTEMS FOR MULTI-DIMENSIONAL AGGREGATION USING COMPOSITION," issued as U.S. Pat. No. 11,068,507, which is a continuation of i) U.S. patent application Ser. No. 13/538,928 filed Jun. 29, 2012, issued as U.S. Pat. No. 10,169,442, and ii) U.S. patent application Ser. No. 13/538,889, filed Jun. 29, 2012, entitled "METHODS AND SYSTEMS FOR MULTI-DIMENSIONAL AGGREGATION USING COMPOSITION," issued as U.S. Pat. No. 10,235,441 each of which are fully incorporated by reference herein for all purposes. This application is a continuation of, and claims a benefit of priority under 35 U.S.C. 120, from U.S. patent application Ser. No. 16/222,991, filed Dec. 17, 2018, entitled "METHODS AND SYSTEMS FOR MULTI-DIMENSIONAL AGGREGATION USING COMPOSITION," issued as U.S. Pat. No. 11,068,507, which is a continuation of i) U.S. patent application Ser. No. 13/538,928 filed Jun. 29, 2012, issued as U.S. Pat. No. 10,169,442, and ii) U.S. patent application Ser. No. 13/538,889, filed Jun. 29, 2012, entitled "METHODS AND SYSTEMS FOR MULTI-DIMENSIONAL AGGREGATION USING COMPOSITION," issued as U.S. Pat. No. 10,235,441, each of which are fully incorporated by reference herein for all purposes.

BACKGROUND

Process modeling relates to the modeling of dynamic systems, such as business process systems. Such systems can be modeled and simulated for a variety of purposes including monitoring, analysis, control, design, simulation, and management. A process model is an abstract description of a process, such as a business process, related to the lifecycle of a system. The abstract description of the process model can include sufficient detail required by a simulation engine for exercising the process model with one or more scenarios to determine a likely outcome. Process models generally specify one or more steps or activities of a process and the relationship between the different steps or activities. As part of the model, one or more events or conditions leading to the transition from one step or activity to the next can be specified so as to define a workflow. Models defining a workflow generally are expressed according to a specific format, such as the Business Process Execution Language (BPEL). Workflows created in a business process modeling environment can be deployed for execution and execution lifecycle management in a web services architecture. Generally, a workflow process execution engine accepts as input a workflow such as that specified in BPEL, and produces one or more executable instances of components requisite to the workflow. Thereafter, the executable instances can be deployed in a network accessible architecture such that end users can access the workflow remotely over a computer communications network. Defining workflows including triggering events, steps, and transitions can be tedious for the uninitiated. Consequently, several workflow design tools provide clients with the graphical expression of workflows in order to ease the process of designing workflows. Sophisticated workflow design tools provide a capability of a drag and drop interface for defining a workflow by dragging and dropping steps from a listing of available steps onto a palette. The drag and drop nature of the conventional workflow design tool acts to minimize the necessity of software development expertise in composing a workflow.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIGS. 3A-3D are tables that illustrate aspects of multi-dimensional aggregation using user interface workflow composition, under an embodiment.

DETAILED DESCRIPTION

Figure 1:
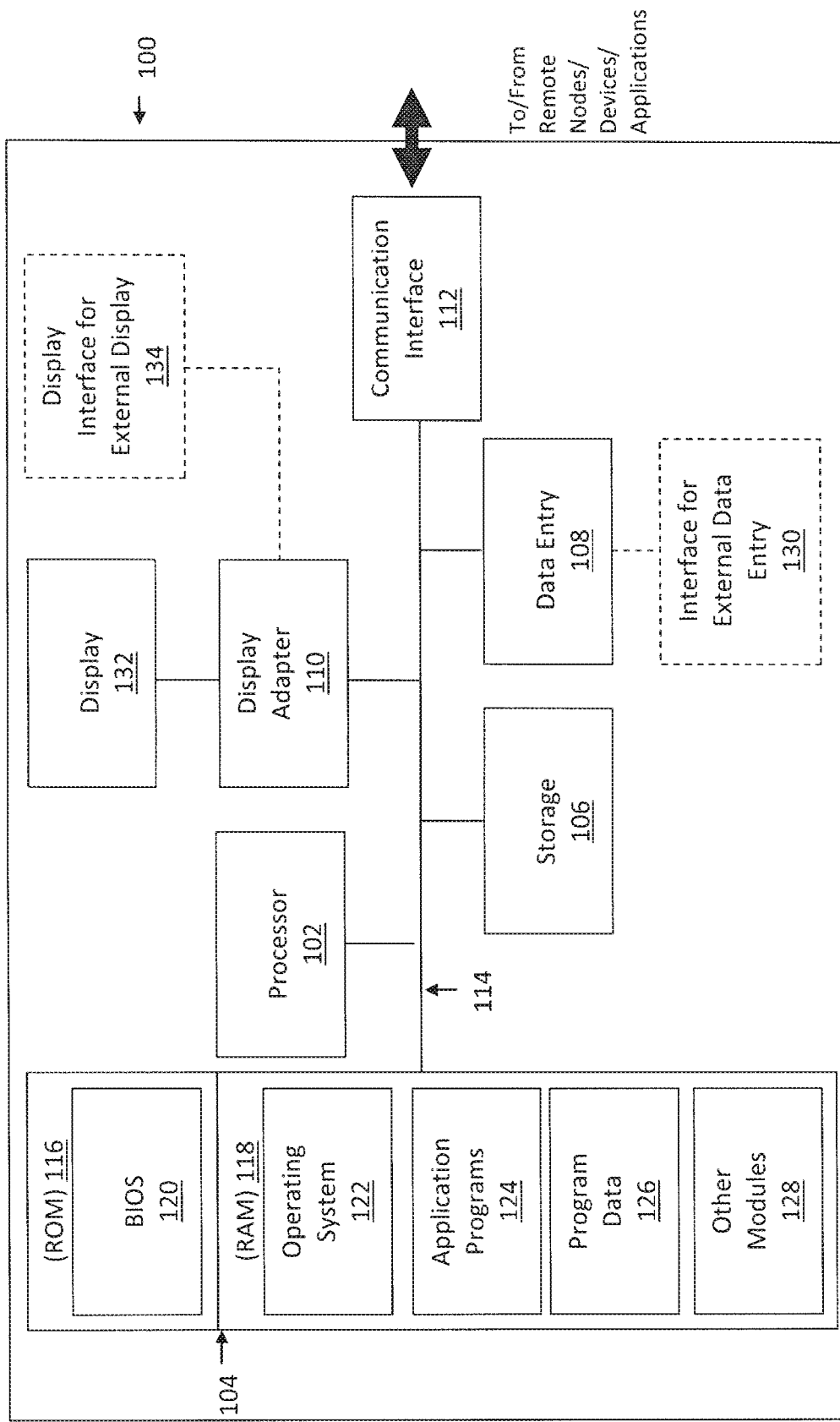
FIG. 1 is a block diagram illustrating an example hardware device in which the subject matter may be implemented.

The subject matter presented herein provides multi-dimensional aggregation using user interface workflow composition that provides solutions to prior art problems. Data for a business process may be stored in a data object, which can relate to another data object in multiple ways. For example, a data object representing a person may have one relationship to one data object representing the person's home address, while a data object representing a business can have multiple relationships to multiple data objects that each represent one of the business' many office addresses. Therefore, when there is a one-to-many relationship for data objects, the relationship may be described as the relationship between one parent object and multiple children objects. In case of one-to-many related objects, calculating aggregate function attributes belonging to one parent object and many children objects is difficult in a single query. Calculating aggregate function attributes is even more difficult for system users who are not sufficiently familiar with structured query languages. Even if a user is somewhat familiar with structured query languages, calculating aggregate function attributes may require multiple complex queries.

Embodiments herein enable multi-dimensional aggregation using user interface workflow composition. A system determines whether aggregation is complete for each level of multi-dimension aggregation. For example, a data source engine determines that aggregation has yet to begin for the first level of multi-dimensional aggregation, the summing of the children objects for each of the parent objects. The system retrieves data for the first level of aggregation in response to a. determination that aggregation is not complete for each level of multi-dimension aggregation. For example, the data source engine retrieves the children objects for each of the parent objects. The system aggregates the data based on the first level of aggregation. For example, an aggregation engine sums the data for the children objects for each of the parent objects. The system stores the aggregated data for the second level of aggregation. For example, the aggregation engine stores the aggregated sum of the data for the children objects for each of the parent objects as the data for the second level of multi-dimensional aggregations. The system determines once again whether aggregation is complete for each level of multi-dimension aggregation. For example, the data source engine determines that aggregation has yet to begin for the second level of multi-dimensional aggregation, the averaging of the sum of the children objects and the averaging of the parent objects. The system retrieves data for the second level of aggregation in response to a determination that aggregation is not complete for each level of multi-dimension aggregation. For example, the data source engine retrieves the parent objects and the aggregated sum of the children objects. The system aggregates the data based on the second level of aggregation. For example, the aggregation engine averages the aggregated sums of the children objects and averages the parent objects. The system stores the aggregated data for the next level of aggregation. For example, the aggregation engine stores the average of the aggregated sum of the children objects and the average of the parent objects as the data for the next level of multi-dimensional aggregations. The system determines once again whether aggregation is complete for each level of multi-dimension aggregation. For example, the data source engine determines that aggregation is complete for the second and final level of multi-dimensional aggregation. The system outputs the data for the final level of aggregation to a user interface in response to a determination that aggregation is complete for each level of the multi-dimension aggregation. For example, the data source engine outputs the average of the aggregated sum of the children objects and the average of the parent objects to the user interface for the client.

Embodiments herein enable calculating aggregate function attributes belonging to one parent and many children using user interface workflow composition. Calculating aggregate function attributes is relatively simple, even for system users who are not sufficiently familiar with structured query languages.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to. the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for client-server communication in a cached communication environment.

The subject matter presented herein provides multi-dimensional aggregation using user interface workflow composition that provides solutions to prior art problems. In case of one-to-many related objects, calculating aggregate function attributes belonging to one parent object and many children objects is difficult in a single query. Calculating aggregate function attributes is even more difficult for system users who are not sufficiently familiar with structured query languages. Even if a user is somewhat familiar with structured query languages, calculating aggregate function attributes may require multiple complex queries.

Figure 2:
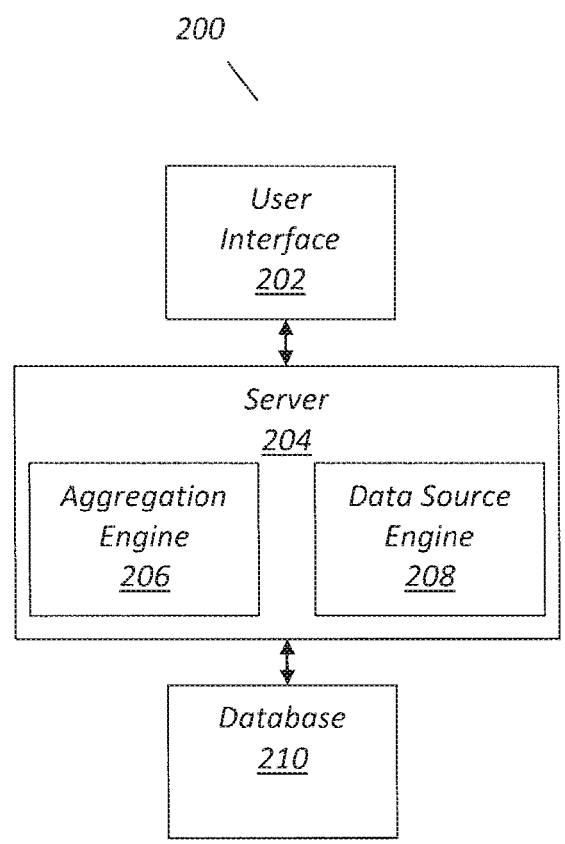
FIG. 2 illustrates a block diagram of an example system for multi-dimensional aggregation using user interface workflow composition, under an embodiment.

FIG. 2 illustrates a block diagram of a system that implements multi-dimensional aggregation using user interface workflow composition, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a user interface 202, a server 204 which includes an aggregation engine 206 and a data source engine 208, and a database 210, which are provided by a hosting company. Although FIG. 2 depicts the system 200 with one user interface 202, one server 204, one aggregation engine 206, one data source engine 208, and one database 210, the system 200 may include any number of user interfaces 202, servers 204, aggregation engines 206, data source engines 208, and databases 210. The system 200 may each be substantially similar to the system 100 depicted in FIG. 1. The functioning of the system 200 and its components 202-210 is illustrated in reference to the description of FIGS. 3A-3D below.

FIGS. 3A-3D are tables that illustrate aspects of multi-dimensional aggregation using user interface workflow composition. FIG. 3A depicts a table of data for two loans, loan 1 and loan 2. Each of the loans is secured by multiple collateral amounts, with loan 1 secured by three collateral amounts and loan 2 secured by two collateral amounts. The data in FIG. 3A represents a one-to-many relationship for its associated data objects. The data object for loan 1 is a parent object that has three children objects for its associated collateral amounts. The data object for loan 2 is a parent object that has two children objects for its associated collateral amounts.

If a loan officer who is unfamiliar with structured query languages wants to compare the average loan amounts to the average collateral amounts, and the loan officer used a prior art user interface workflow tool, the results may be the data depicted in FIG. 3B. Simply dragging and dropping an averaging function from a listing of available functions into a work area and applying the averaging function to the table of data depicted in FIG. 3A produces the incorrect results depicted in FIG. 3B. For example, the averaging function adds the loan amount 460,000 for loan 1 three times because loan 1 has three children objects, and adds the loan amount 375,000 for loan 2 twice because loan 2 has two children objects, and divides the sum of the five loan amounts by five to produce the value of 426,000. However, the averaged amount of a loan for 460,000 and a loan for 375,000 is 417,500, not 426,000. This error in averaging the loan amount is due to the multiple listings of each loan amount in FIG. 3A to reflect the one parent to many children relationships that each of these loans have. Furthermore, the averaging of the collateral amounts produces the value of 174,000, which is significantly less than the average loan amount calculated as 426,000. This error in averaging the collateral amount is due to the averaging function treating each of these children objects for the collateral amounts as unrelated to one another, whereas these children objects for the collateral amounts are collectively related to parent objects for the loan amounts.

Embodiments herein enable calculating aggregate function attributes belonging to one parent and many children using user interface workflow composition. The user interface 202 enables a user to select a parent object related to children objects. For example, a user selects the loans depicted in FIG. 3A for multi-dimensional aggregation.

The system 200 determines a number of levels associated with a user-selected parent object related to the children objects. For example, the data source engine 208 determines that the loans depicted in FIG. 3A have two levels, the parent level for the loan amounts and the children level for the collateral amounts.

One of the children objects for the collateral amounts may be a second parent object related to a second set of children objects for lien amounts, one of the second set of children objects for lien amounts may be a third parent object related to a third set of children objects, and one of the third set of children objects may be a fourth parent object related to a fourth set of children objects. Each level of aggregation is a dimension of the required result. Each time a new dimension is required for a result, another level of aggregation is added. For example, if a user requested aggregation of the lien amounts, three levels of aggregation would be required to aggregate the lien amounts, the collateral amounts, and the loan amounts. Each level of multi-dimension aggregation is based on a corresponding level of a user-selected parent object to children objects. For example, if a user requested aggregation of only the collateral amounts, only two levels of aggregation would be required to aggregate the collateral amounts and the loan amounts, even if the collateral amounts were parent objects for an additional level of children objects that stored lien amounts. The number of levels of multi-dimension aggregation is scalable to the number of levels for parent objects and children objects.

The user interface 202 enables a user to select an aggregation function from a set of aggregation functions, such a counting function, a summing function, and an averaging function, and apply the user-selected aggregation function to a user-selected parent object related to children objects. For example, the user selects to apply an averaging function to the loan amounts and the related collateral amounts depicted in FIG. 3A. However, applying an averaging function directly to the data depicted in FIG. 3A would result in the incorrect averages depicted in FIG. 3B. Therefore, applying the user-selected aggregation function to the user-selected parent object related to the children objects requires aggregating data associated with the children objects prior to applying the user-selected aggregation function to the user-selected parent object related to the children objects. For example, the system 200 will first aggregate the collateral amounts in the children objects to determine the sum of the collateral amounts during a first level of aggregation, and then apply the averaging function to the loan amounts and the sum of the collateral amounts during a second level of aggregation.

The system 200 periodically determines whether aggregation is complete for each level of multi-dimension aggregation. For example, the data source engine 208 determines that aggregation has yet to begin for the first level of multi-dimensional aggregation, the summing of collateral amounts in the children objects for each of the parent objects in FIG. 3A. The basis for the periodic determination may be hourly, daily, weekly, monthly, quarterly, or yearly.

The system 200 retrieves data for the first level of aggregation in response to a determination that aggregation is not complete for each level of multi-dimension aggregation. For example, the data source engine 208 retrieves the collateral loan amounts of 200,000, 170,000, 100,000, 300,000, and 100,000, which are the children objects for each of the loans in the parent objects in the database 210. Retrieving data for the level of aggregation comprises retrieving instance data for a first level of aggregation. For example, unlike subsequent levels of aggregation that will use previous aggregations as at least part of their input, the first level of aggregation uses previously non-aggregated data from a data source table as an input, such as the collateral amounts depicted in FIG. 3A.

The system 200 aggregates the data based on the first level of aggregation. For example, the aggregation engine 206 sums the collateral amounts of 200,000, 170,000, and 100,000 to produce 470,000 as an aggregated sum of collateral for loan 1, and sums the collateral amounts 300,000 and 100,000 to produce 400,000 as an aggregated sum of collateral for loan 2. Aggregating the data based on the level of multi-dimension aggregation includes inserting data in instance tables located in computer memory. For example, the aggregation engine 206 stores the collateral amounts of 200,000, 170,000, and 100,000 and the collateral amounts 300,000 and 100,000 in instance tables in memory to enable the summation of these amounts.

The system 200 stores the aggregated data for the second level of aggregation. For example, the aggregation engine 206 stores 470,000 and 400,000, the aggregated sum of the children objects for each of the parent objects, in the database 210 in an aggregation table as the data for the second level of multi-dimensional aggregations.

The data depicted in the table of FIG. 3C represents the loan amounts and the sum of the collateral amounts which were correctly calculated by the first level of multi-dimensional aggregation, the summing of the collateral amounts. The result of the first level of multi-dimensional aggregation will serve as the input for the second level of multi-dimensional aggregation, the averaging function.

The system 200 determines once again whether aggregation is complete for each level of multi-dimension aggregation. For example, the data source engine 208 determines that aggregation has yet to begin for the second level of multi-dimensional aggregation, the averaging of the sum of the children objects and the averaging of the parent objects.

The system 200 retrieves data for the second level of aggregation in response to a determination that aggregation is not complete for each level of multi-dimension aggregation. For example, the data source engine 208 retrieves the values 470,000 and 400,000 for the aggregated sums of the children objects and the values 460,000 and 375,000 for the parent objects from the aggregation table in the database 210.

The system 200 aggregates the data based on the second level of aggregation. For example, the aggregation engine 206 averages the collateral values 470,000 and 400,000, the aggregated sums of the children objects, and averages the loan amounts 460,000 and 375,000, the values of the parent objects, to produce the collateral value 435,000 as the average of the aggregated sum of the children objects and the loan value 417,500 as the average of the parent objects as the data for the second level of multi-dimensional aggregations.

The system 200 stores the aggregated data for the second level of aggregation. For example, the aggregation engine 206 stores the collateral value 435,000 as the average of the aggregated sum of the children objects and the loan value 417,500 as the average of the parent objects as the data for the second level of multi-dimensional aggregations in the database 210. The data depicted in the table of FIG. 3D represents the average loan amounts and the average of the sum of the collateral amounts which were correctly calculated by the second level of multi-dimensional aggregation, the averaging of the amounts depicted in FIG. 3A.

The system 200 determines once again whether aggregation is complete for each level of multi-dimension aggregation. For example, the data source engine 208 determines that aggregation is complete for the second and final level of multi-dimensional aggregation.

The system 200 outputs the data for the final level of aggregation to a user interface in response to a determination that aggregation is complete for each level of the multi-dimension aggregation. For example, the data source engine 208 outputs the collateral value 435,000 as the average of the aggregated sum of the children objects and the loan value 417,500 as the average of the parent objects to the user interface for the client. Outputting the data for the final level of aggregation creates a data source that has a list of entity names, a list of fields, computed columns definitions, aggregation field definitions, and structured query language statements for data retrieval.

The data depicted in the table of FIG. 3D is based on correct calculations of one-to-many data object, and indicates to the loan officer that the loans are secured on average by collateral that values at 4% greater than the average value of the loans (435,000 is 104% of 417,500). Calculating aggregate function attributes is relatively simple, even for system users who are not sufficiently familiar with structured query languages.

Figure 4:
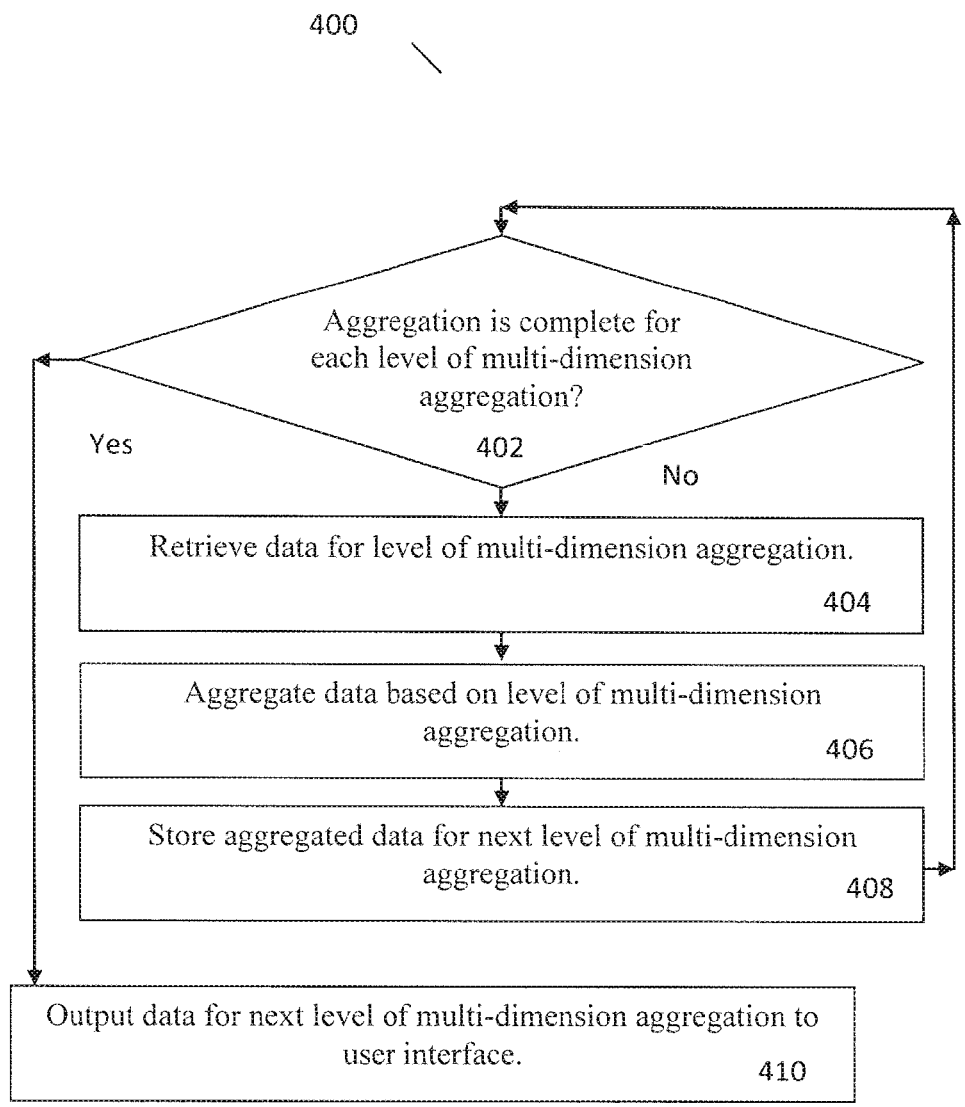
FIG. 4 is a flowchart that illustrates a method of multi-dimensional aggregation using user interface workflow composition, under an embodiment.

FIG. 4 is a flowchart that illustrates a method of multi-dimensional aggregation using user interface workflow composition. Flowchart 400 illustrates method acts illustrated as flowchart blocks for certain steps involved in the system 200 of FIG. 2.

The system 200 determines whether aggregation is complete for each level of multi-dimension aggregation, act 402. For example, the data source engine 208 determines that aggregation has yet to begin for the first level of multi-dimensional aggregation, the summing of the children objects for each of the parent objects in FIG. 3A. If the system 200 determines that aggregation is not complete for each level of multi-dimension aggregation, the flowchart 400 continues to act 404. If system 200 determines that aggregation is complete for each level of multi-dimension aggregation, the flowchart 400 proceeds to act 410.

The system 200 retrieves data for a level of multi-dimension aggregation, act 404. For example, the data source engine 208 retrieves the collateral amounts 200,000, 170,000, 100,000, 300,000, and 100,000 of the children objects for each of the parent objects.

The system 200 aggregates data based on a level of multi-dimension aggregation, act 406. For example, the aggregation engine 206 sums the children objects for each of the parent objects to create the aggregated sums of 470,000 for loan 1 and 400,000 for loan 2.

The system 200 stores aggregated data for a next level of multi-dimension aggregation, act 408. For example, the aggregation engine stores the aggregated sums of 470,000 for loan 1 and 400,000 for loan 2 as the data for the second level of multi-dimensional aggregations, the averaging function. Then the flowchart 400 returns to act 402 to determine whether aggregation is complete for each level of multi-dimensional aggregation.

The system 200 outputs data for a final level of aggregation to a user interface, act 410. For example, the data source engine 208 outputs the average of the sum of the collateral amounts, 435,000, which is the average of the aggregated sum of the children objects, and the average loan amount, 417,500, which is the average of the parent objects to the user interface for the client.

Following act 410, the flowchart 400 may terminate. Although FIG. 4 depicts the acts 402-410 occurring in a specific order, the acts 402-410 may occur in another order.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for multi-dimensional aggregation comprising:
a processor;
a non-transitory, computer-readable medium storing a set of instructions executable by the processor, wherein the set of instructions include instructions for:
storing data for a computer implemented process in a set of related data objects in a data store, each object in the set of related data objects representing an entity modelled in the process;
receiving a request generated responsive to a user interaction in a user interface of a workflow composition tool during workflow composition, the user interaction including user selection of a set of parent objects each having a set of children objects and user selection of an aggregation function to apply a multi-dimensional aggregation of data from the set of the user-selected parent objects and the set of children objects, the user-selected aggregation function selected by the user from a plurality of aggregation functions selectable from the user interface;
determining a number of levels for the multi-dimensional aggregation associated with the request, each level of the multi-dimensional aggregation representing a different dimension of data values to be aggregated,
wherein the multi-dimensional aggregation of data from the set of the user-selected parent objects and the set of children objects to be applied is configured for:
for each parent object in the set of parent objects:
retrieving children object data for a first level of multi-level aggregation for a related set of children objects related to that parent object,
aggregating the children object data to generate aggregated children object data for that parent object, and
outputting the aggregated children object data for use in a second level of multi-dimensional aggregation;
for the second level of multi-dimensional aggregation:
applying the user-selected aggregation function to parent object data from the set of parent objects to generate a data value for a first dimension of the multi-dimensional aggregation, and
applying the user-selected aggregation function using the aggregated children object data for each parent object to generate a data value for a second dimension of the multi-dimensional aggregation to generate a final result; and
outputting the final result to the user interface, the final result including multiple dimensions of data values.

2. The system of claim 1, wherein the user interface is a drag and drop interface of the workflow composition tool that allows the user to drag a representation of the user-selected aggregation function from a list of aggregations functions into a work area, wherein the user interaction comprises a user dragging the representation of the user-selected aggregation function into the work area.

3. The system of claim 1, wherein receiving the request comprises receiving the request at a server from a processor-based client application and wherein outputting the final result to the user interface comprises sending the final result from the server to the processor-based client application.

4. The system of claim 1, wherein the set of instructions further comprises instructions for periodically determining whether aggregation is complete for each level of the multi-dimensional aggregation and outputting the final result to the user interface responsive to a determination that aggregation is complete for each level of the multi-dimensional aggregation.

5. The system of claim 1, further comprising a computer memory coupled to the processor and a database, wherein aggregating the data for the related set of children objects to generate the aggregated children object data for each parent object comprises inserting the data for the related set of children objects in an instance table in the computer memory to enable aggregating the data for the related set of children objects, and wherein the set of instructions comprises instructions for storing the aggregated children object data in the database for use in a next level of the multi-dimensional aggregation.

6. The system of claim 1, wherein retrieving data for the first level of multi-level aggregation from the related set of children objects comprises retrieving non-aggregated data from a data source table.

7. The system of claim 1, wherein aggregating the data from the related set of children objects to generate the aggregated children object data for each parent object comprises applying a different function than the user-selected aggregation function.

8. The system of claim 1, wherein outputting the final result to the user interface comprises creating a data source that has a list entity names, a list of fields, computed column definitions, aggregation field definitions, and structured query language statements for data retrieval.

9. The system of claim 1, wherein the selectable plurality of aggregation functions comprises a counting function, a summing function, and an averaging function.

10. A computer program product comprising a non-transitory, computer-readable medium storing a set of instructions executable by a processor, wherein the set of instructions include instructions for:
   accessing data for a computer implemented process from a set of related data objects in a data store, each object in the set of related data objects representing an entity modelled in the process;
   receiving a request generated responsive to a user interaction in a user interface of a workflow composition tool during workflow composition, the user interaction including user selection of a set of parent objects each having a set of children objects and user selection of an aggregation function to apply a multi-dimensional aggregation of data from the set of the user-selected parent objects and the set of children objects, the user-selected aggregation function selected by the user from a plurality of aggregation functions selectable from the user interface;
   determining a number of levels for the multi-dimensional aggregation associated with the request, each level of the multi-dimensional aggregation representing a different dimension of data values to be aggregated,
   wherein the multi-dimensional aggregation of data from the set of the user-selected parent objects and the set of children objects to be applied is configured for:
      for each parent object in the set of parent objects:
         retrieving children object data for a first level of multi-level aggregation for a related set of children objects related to that parent object,
         aggregating the children object data to generate aggregated children object data for that parent object,
         and outputting the aggregated children object data for use in a second level of multi-dimensional aggregation;
      for the second level of multi-dimensional aggregation:
         applying the user-selected aggregation function to parent object data from the set of parent objects to generate a data value for a first dimension of the multi-dimensional aggregation, and
         applying the user-selected aggregation function using the aggregated children object data for each parent object to generate a data value for a second dimension of the multi-dimensional aggregation to generate a final result; and
      outputting the final result to the user interface, the final result including multiple dimensions of data values.

11. The computer program product of claim 10, wherein the user interface is a drag and drop interface of the workflow composition tool that allows the user to drag a representation of the user-selected aggregation function from a list of aggregations functions into a work area, wherein the user interaction comprises a user dragging the representation of the user-selected aggregation function into the work area.

12. The computer program product of claim 10, wherein receiving the request comprises receiving the request at a server from a processor-based client application and wherein outputting the final result to the user interface comprises sending the final result from the server to the processor-based client application.

13. The computer program product of claim 10, wherein the set of instructions further comprises instructions for periodically determining whether aggregation is complete for each level of the multi-dimensional aggregation and outputting the final result to the user interface responsive to a determination that aggregation is complete for each level of the multi-dimensional aggregation.

14. The computer program product of claim 10, wherein aggregating the data for the related set of children objects to generate the aggregated children object data for each parent object comprises inserting the data for the related set of children objects in an instance table in a computer memory that is coupled to the processor, to enable aggregating the data for the related set of children objects, and wherein the set of instructions comprises instructions for storing the aggregated children object data in a database for use in a next level of the multi-dimensional aggregation.

15. The computer program product of claim 10, wherein retrieving data for the first level of multi-level aggregation from the related set of children objects comprises retrieving non-aggregated data from a data source table.

16. The computer program product of claim 10, wherein aggregating the data from the related set of children objects to generate the aggregated children object data for each parent object comprises applying a different function than the user-selected aggregation function.

17. The computer program product of claim 10, wherein outputting the final result to the user interface comprises creating a data source that has a list of entity names, a list of fields, computed column definitions, aggregation field definitions, and structured query language statements for data retrieval.

18. The computer program product of claim 10, wherein the selectable plurality of aggregation functions comprises a counting function, a summing function, and an averaging function.

19. A computer-implemented method for multi-dimensional data aggregation using workflow composition, the method comprising:
   accessing data for a computer implemented process from a set of related data objects in a data store, each object in the set of related data objects representing an entity modelled in the process;
   receiving a request generated responsive to a user interaction in a user interface of a workflow composition tool during workflow composition, the user interaction including user selection of a set of parent objects each having a set of children objects and user selection of an aggregation function to apply a multi-dimensional aggregation of data from the set of the user-selected parent objects and the set of children objects, the user-selected aggregation function selected by the user from a plurality of aggregation functions selectable from the user interface;
   determining a number of levels for the multi-dimensional aggregation associated with the request, each level of the multi-dimensional aggregation representing a different dimension of data values to be aggregated,
   wherein the multi-dimensional aggregation of data from the set of the user-selected parent objects and the set of children objects to be applied is configured for:
      for each parent object in the set of parent objects:
         retrieving children object data for a first level of multi-level aggregation for a related set of children objects related to that parent object,
         aggregating the children object data to generate aggregated children object data for that parent object, and
         outputting the aggregated children object data for use in a second level of multi-dimensional aggregation;
      for the second level of multi-dimensional aggregation:
         applying the user-selected aggregation function to parent object data from the set of parent objects to generate a data value for a first dimension of the multi-dimensional aggregation, and applying the user-selected aggregation function using the aggregated children object data for each parent object to generate a data value for a second dimension of the multi-dimensional aggregation to generate a final result; and outputting the final result to the user interface, the final result including multiple dimensions of data values.

20. The method of claim 19, wherein the user interface is a drag and drop interface of the workflow composition tool that allows the user to drag a representation of the user-selected aggregation function from a list of aggregation functions into a work area, wherein the user interaction comprises a user dragging the representation of the user-selected aggregation function into the work area.

21. The method of claim 19, wherein receiving the request comprises receiving the request at a server from a processor-based client application and wherein outputting the final result to the user interface comprises sending the final result from the server to the processor-based client application.

22. The method of claim 19, further comprising:

periodically determining whether aggregation is complete for each level of the multi-dimensional aggregation and outputting the final result to the user interface responsive to a determination that aggregation is complete for each level of the multi-dimensional aggregation.

23. The method of claim 19, wherein aggregating the data for the related set of children objects to generate the aggregated children object data for each parent object comprises inserting the data for the related set of children objects in an instance table in a computer memory that is coupled to the processor, to enable aggregating the data for the related set of children objects, and wherein the set of instructions comprises instructions for storing the aggregated children object data in a database for use in a next level of the multi-dimensional aggregation.

24. The method of claim 19, wherein retrieving data for the first level of multi-level aggregation from the related set of children objects comprises retrieving non-aggregated data from a data source table.

25. The method of claim 19, wherein aggregating the data from the related set of children objects to generate the aggregated children object data for each parent object comprises applying a different function than the user-selected aggregation function.

26. The method of claim 19, wherein outputting the final result to the user interface comprises creating a data source that has a list of entity names, a list of fields, computed column definitions, aggregation field definitions, and structured query language statements for data retrieval.

27. The computer-implemented method of claim 19, wherein the selectable plurality of aggregation functions comprises a counting function, a summing function, and an averaging function.

* * * * *